United States Patent [19]
Agari

[11] Patent Number: 5,374,127
[45] Date of Patent: Dec. 20, 1994

[54] LINEAR MOTION ROLLING GUIDE UNIT

[75] Inventor: Norimasa Agari, Seki, Japan

[73] Assignee: Nippon Thompson Co., Ltd., Tokyo, Japan

[21] Appl. No.: 165,831

[22] Filed: Dec. 14, 1993

[30] Foreign Application Priority Data

Dec. 17, 1992 [JP] Japan .................. 4-091498[U]

[51] Int. Cl.⁵ ............................................. F16C 29/06
[52] U.S. Cl. ......................................... 384/15; 384/45
[58] Field of Search ..................... 384/15, 16, 45, 44, 384/43; 464/168

[56] References Cited

U.S. PATENT DOCUMENTS 4,921,358  5/1990  Kasuga et al. .................. 384/15
5,092,685  3/1992  Tonogai ........................... 384/45

FOREIGN PATENT DOCUMENTS 1183171991  12/1991  Japan .
1212201991  12/1991  Japan .

Primary Examiner—Lenard A. Footland
Attorney, Agent, or Firm—Browdy and Neimark

[57] ABSTRACT

The linear motion rolling guide unit according to this invention enables the under seals to be mounted directly to the end seals without requiring other fastening parts, allows for machining errors and prevents the under seals from being deformed as by buckling. End seals attached to the outer sides of the end caps are formed at their lower ends with paired projections, and the under seals are formed at their longitudinal ends with locking notches. The under seals are placed in tight contact with the undersides of the casing and the end caps, and then the paired projections are inserted into the locking notches and the free ends of the paired projections are bent to firmly grip the core member of each under seal, thereby mounting the under seals to the end seals.

7 Claims, 3 Drawing Sheets

LINEAR MOTION ROLLING GUIDE UNIT

BACKGROUND OF THE INVENTION

1. Field of the Invention

The present invention relates to a linear motion rolling guide unit, which is applied to a variety of relatively sliding portions in machine tools and testing equipment and in which a slider is mounted slidable on a track rail with rolling elements interposed therebetween.

2. Description of the Prior Art

In conventional linear motion rolling guide units, the sealing between a track rail and a slider that slides on it is realized by end seals attached to the ends of the slider and under seals attached to the underside of the slider.

A linear motion rolling guide unit as shown in FIG. 6 has been known. FIG. 6 shows a perspective view of one example of a conventional linear motion rolling guide unit.

As shown in the figure, the linear motion rolling guide unit includes a track rail 1 having raceway grooves 9 extending longitudinally on both side wall surfaces 11 thereof, and a slider 19 slidably mounted astride on the track rail 1. The slider 19 has a casing 2, which is slidable relative to the track rail 1 and has raceway grooves 8 formed at positions facing the raceway grooves 9 on the track rail 1, a number of rolling elements 4 trapped and running between the opposing raceway grooves 8 and 9, and end caps 5 attached to the longitudinal ends of the casing 2, the longitudinal direction being the sliding direction of the casing 2. The end cap 5 has an end seal 30 for sealing between the track rail 1 and the slider 19. The end cap 5 is also provided with a grease nipple 18 for supplying lubricant to the sliding surfaces between the track rail 1 and the slider 19. To prevent the rolling elements 4 from coming off the casing 2, retainer bands 17 are provided to the casing 2 in such a way as to enclose these balls 4. Under seals 3 are arranged at the undersides of the end caps 5 and the casing 2 to seal sliding portions between the casing 2, the end caps 5 and the longitudinal side wall surfaces 11 of the track rail 1.

The slider 19 is mounted astride on the track rail 1 and freely slides on it by means of a number of rolling elements 4 that circulate along the raceway grooves 9 in the track rail 1. The rolling elements 4 that travel loaded along the raceway grooves 9 of the track rail 1 are led to direction changing passages formed in the end caps 5 and further to return passages 10 formed in the upper part of the casing 2 parallel to the raceway grooves 8. Thus, the rolling elements 4 run endlessly through endless circulating passages. In this way, the slider 19 is allowed to slide relative to the track rail 1 by the rolling elements 4 traveling loaded between the raceway grooves 8 on the slider 19 and the raceway grooves 9 on the track rail 1.

The under seal 3, though it has an advantage of being thin and simple in construction and easily manufactured, also has drawbacks that because the under seal 3 is thin, it is easily deformed by external forces and by positioning errors between it and the casing 2 and track rail 1, the casing and track rail having the raceway grooves 8, 9 respectively.

To describe in more detail, because the conventional linear motion rolling guide unit takes no countermeasures against elongation of the under seal resulting from thermal expansion, the under seal, when elongated, cannot maintain good sealing condition. That is, if the under seal is rigidly engaged with the end seals or with the end caps, the difference in thermal expansion between the under seal and the end caps or casing will cause unequal elongations in the engaged portion of the under seal and in the corresponding engaged portion of the casing and end caps, with the result that the under seals may become deformed or buckled, impairing the sealing condition.

In an under seal apparatus for a linear motion guide bearing disclosed in the Japanese Utility Model 118317/1991, axial ends of the under seal are formed with axially extending projections and end seals are formed at their lower end surfaces with engagement holes for receiving the projections of the under seal. The under seal can be mounted easily and swiftly and prevented from coming off, simply by fitting the projections of the under seal into the engagement holes in the end seals. Dimensional errors between the projections and the engagement holes can be offset easily by elastic deformation of the projections or of elastic pieces placed at the engaged locations. This under seal apparatus, however, is not so constructed as to make the under seal bear tightly on the underside of the slider.

In another under seal apparatus for a linear motion guide bearing disclosed in the Japanese Utility Model 121220/1991, the axial ends of the under seal are provided with two-pronged projections protruding toward the underside of the slider, the two prongs diverging in a V-shape and being elastically deformable toward each other. The slider has the axial end portions of the underside thereof formed with vertical holes, into which the two-pronged projections of the under seal are fitted, and also with through-holes that intersect the vertical holes perpendicularly and pass through the arm or wing portions of the slider so as to receive the two-pronged projections of the under seal therein. The under seal is mounted by inserting the two-pronged projections of the under seal into the vertical holes formed in the underside of the slider; and the slider is prevented from coming off by the engagement of the projections. At the same time, one of the two prongs fitted into the vertical holes is elastically deformed in the vertical holes, thereby preloading a lip portion of the under seal that is in sliding contact with the side wall surface of the guide rail. This linear motion guide bearing, however, does not consider a situation where there are dimensional errors with the insertion vertical holes and the two-pronged projections.

SUMMARY OF THE INVENTION

A major objective of the present invention is to solve the above-mentioned problems and to provide a linear motion rolling guide unit, which has a simple construction for mounting the under seals to the end seals that obviates other fastening means, that facilitates the mounting and dismounting of the under seals as well as their positioning with respect to the end seals, that offset dimensional errors of the under seals and the end seals, and that accommodates elongation of the under seals resulting from thermal expansion, thereby maintaining good sealing performance of the under seals.

According to one aspect of this invention there is provided a linear motion rolling guide unit, which comprises:

a track rail having raceway grooves formed on longitudinally extending side wall surfaces thereof;

a casing slidable relative to the track rail and having second raceway grooves formed at positions facing the first raceway grooves;

end caps mounted to the longitudinal ends of the casing;

end seals attached to the outer sides of the end caps;

rolling elements circulating through raceways formed between the opposing raceway grooves;

under seals arranged on the undersides of the casing and the end caps, the under seals including core members and seal members secured to the core members for sealing the casing, the end caps and the track rail;

downwardly protruding, paired projections provided, laterally spaced apart, to the lower ends of the end seals; and locking notches formed at both longitudinal ends of the under seals at positions corresponding to the paired projections of the end seals so as to receive the paired projections and thereby mount the under seals to the end seals.

In this linear motion rolling guide unit, the procedure for mounting the under seals to the end seals involves inserting the paired projections into the locking notches to bring the under seals into tight contact with the undersides of the casing and the end caps, and bending the free ends of the paired projections away from each other in the lateral direction to firmly grip the core members of the under seals. The free ends of the paired projections after being bent constitute locking portions for the under seals.

With the free ends of the paired projections bent, the under seals are assembled to the slider so that they bear on the undersides of the casing and the end caps and the lip portions of the under seals come into contact with the side wall surfaces of the track rail. This construction is simple and assures easy mounting of the under seals to the end seals. This structure also permits positioning of the under seals in all directions by the paired projections of the end seals and the locking notches of the under seals. The mounting of the under seals is accomplished by simply assembling them to the end seals and requires no other fastening parts.

The under seals are supported by the locking portions at the bent free ends of the paired projections of the end seals. Because the projections are made of elastic material and thus has spring force, the under seals are elastically supported by the end seals. Hence, when the under seals extend longitudinally by external force or thermal expansion difference, their elongation is offset by the paired projections being elastically deformed.

Provision of gaps between the lateral side surfaces of the locking notches in the under seals and the facing surfaces of the projections allows the under seals to slip against the spring force of the projections relative to the track rail. Hence, according to the amount of wear of the lip portion of the under seal, the under seal can be moved toward the track rail to recover the proper contact between them.

If there are any machining errors in the under seals and the end seals, they can be offset by the elastic deformation of the projections, allowing the under seals to be mounted to the end seals reliably. Furthermore, this mounting structure enables the under seals to bear tightly on the undersides of the casing and the end caps, maintaining the sealing performance of the under seals.

Another notable aspect of this invention is that since the assembly of the under seals to the slider is done by bending the lower free ends of the paired projections protruding from the bottom of the end seals to grip the core members of the under seals, the amount that the mounting portion protrudes downwardly below the under seals is very small. This in turn makes it possible to increase the distance between the bed on which the track rail is installed and the underside of the slider, improving the freedom of design of the linear motion rolling guide unit.

Because the edge of the lip portion of the under seal is preloaded to bear on the side wall surface of the track rail, the projections of the end seals are elastically deformed in a direction away from the track rail. This ensures that if the front edge of the lip portion wears out over a long period of use from the sliding contact with the side wall surface of the track rail, the under seal can be adjusted to its proper position with respect to the track rail according to the degree of wear of the lip portion because the elastically deformed projections tend to return to their original shape, thus maintaining the good sealing condition for the side wall surface of the track rail. Depending on circumstances, a gap or space may be formed in the locking notches to allow the projections to move laterally inwardly so that the under seal can be adjusted in position according to the wear of the lip portion.

DETAILED DESCRIPTION OF THE EMBODIMENT

Figure 1:
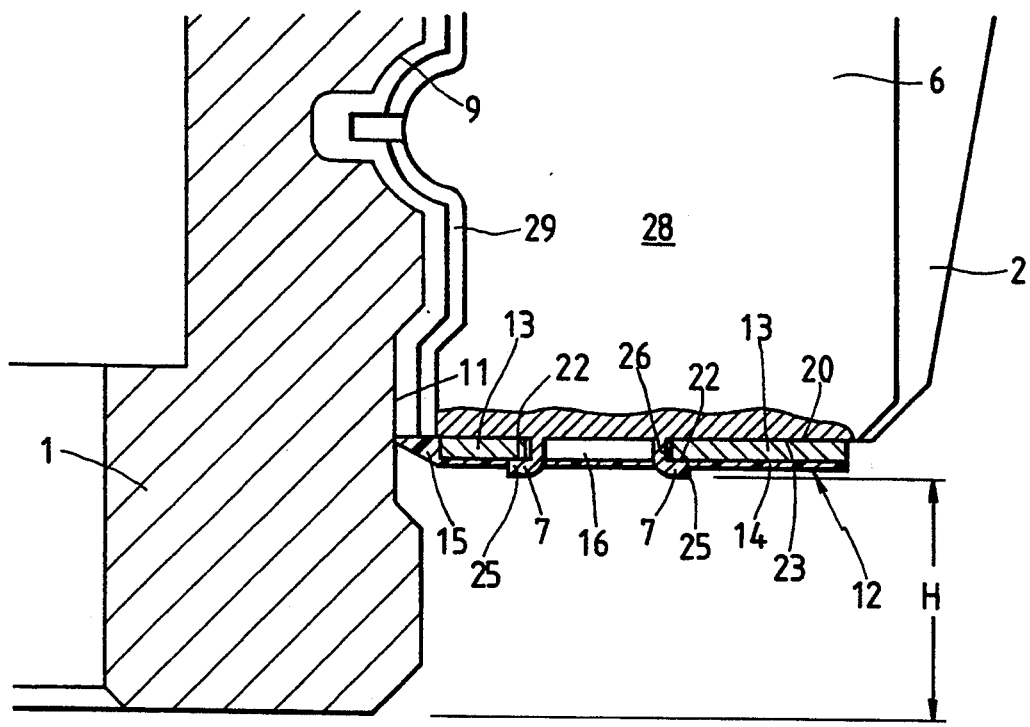
FIG. 1 is a partially cut-away cross section showing a part of the linear motion rolling guide unit as one embodiment of the present invention.
Figure 2:
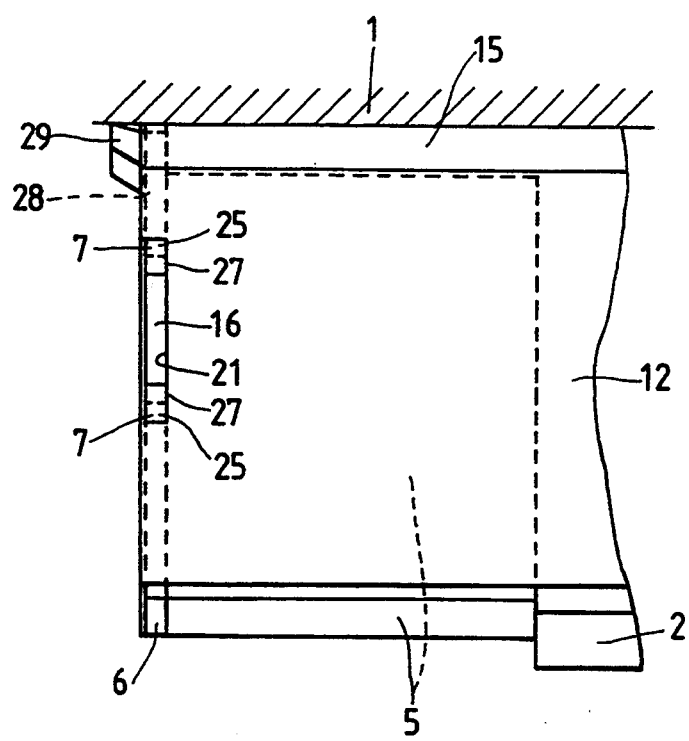
FIG. 2 is a bottom view showing a part of the linear motion rolling guide unit of FIG. 1.
Figure 3:
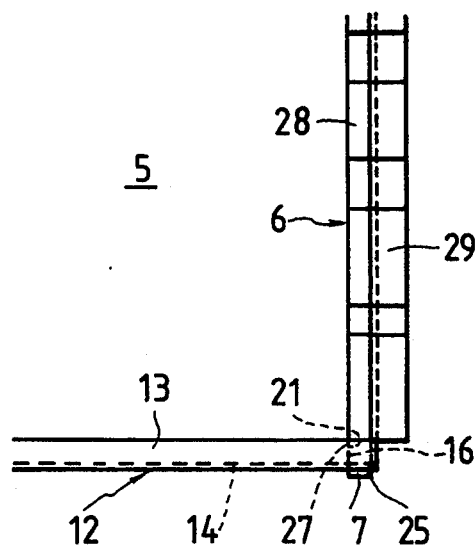
FIG. 3 is an inner side view showing the mounting structure between the under seal and the end seal of the linear motion rolling guide unit of FIG. 1.
Figure 4:
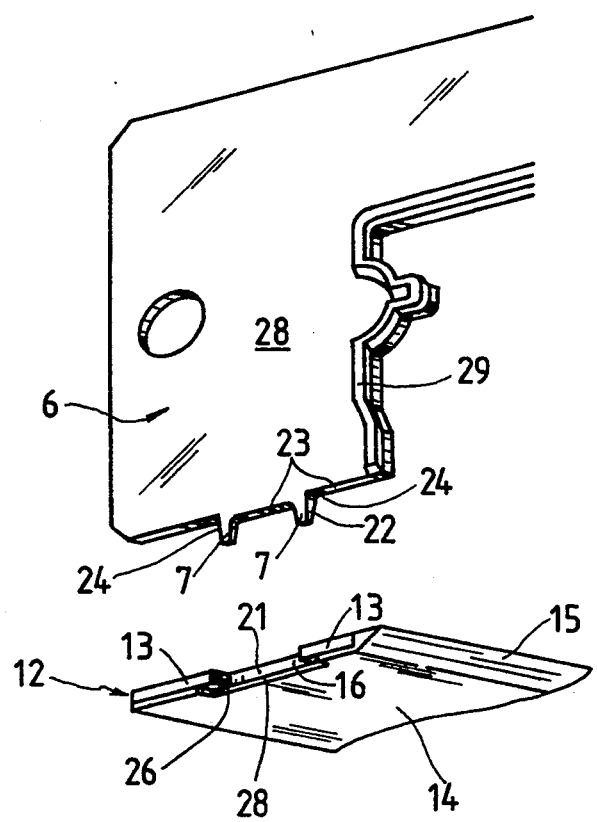
FIG. 4 is an exploded perspective view showing how the under seal and the end seal in the linear motion rolling guide unit of FIG. 1 are assembled together.
Figure 5:
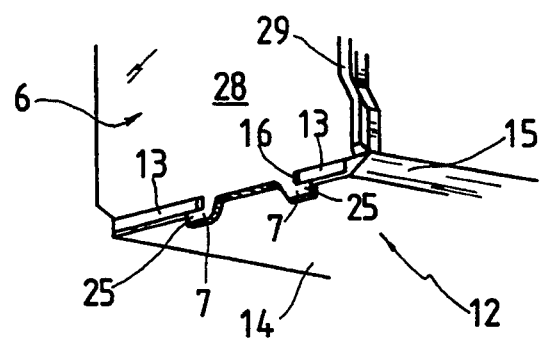
FIG. 5 is a perspective view showing the under seal and the end seal in the assembled condition.

Now, one embodiment of the linear motion rolling guide unit according to this invention will be described by referring to FIGS. 1, 2, 3, 4 and 5. In these figures components having the same functions or actions as those in FIG. 6 are assigned like reference numerals.

Figure 6:
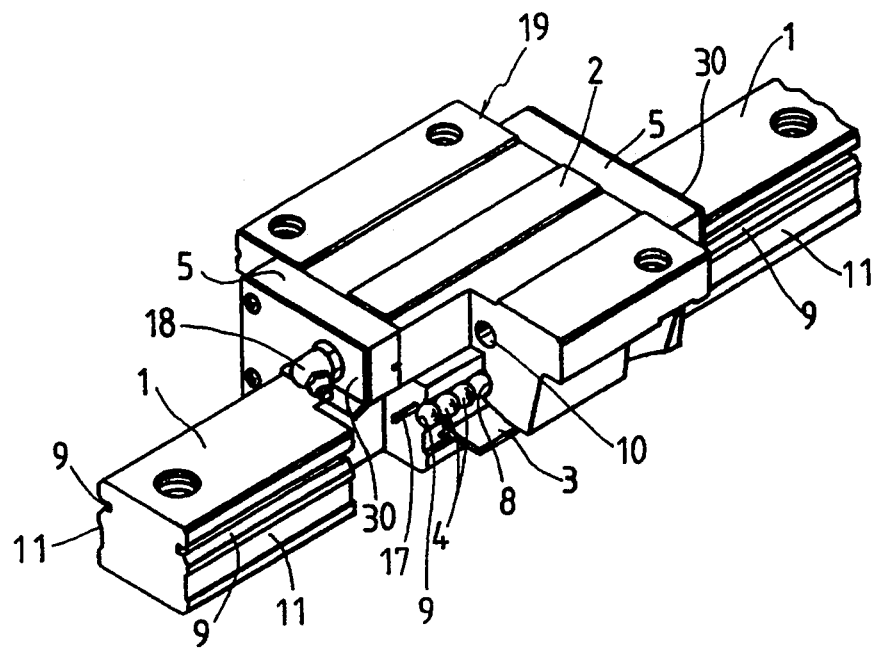
FIG. 6 is a perspective view of one example of a conventional linear motion rolling guide unit.

The linear motion rolling guide unit of this invention is basically the same in construction as the linear motion rolling guide unit of FIG. 6 and is characterized in the construction in which the under seal 12 is mounted to the end seals 6.

The linear motion rolling guide unit of this invention comprises a track rail 1 having raceway grooves 9 extending longitudinally on both side wall surfaces 11 thereof; and a slider 19 mounted astride on and slidable relative to the track rail 1, as shown in FIG. 6. The slider 19 includes a casing 2 slidable relative to the track rail 1 and having raceway grooves 8 at positions facing the raceway grooves 9; rolling elements 4 running through raceways formed between the opposing raceway grooves 8 and 9; end caps 5 attached to the longitudinal ends of the casing 2; end seals 6 attached to the far side of the end caps 5 from the casing; and under seals 12 mounted to the undersides of the casing 2 and the end caps 5.

The under seal 12 provides a seal for the track rail 1, the casing 2 and the end caps 5. The under seal 12 comprises a core member 13 made of such metallic materials as steel and a seal member 14 made of such elastic materials as rubber and plastics secured to the core member 13. The seal member 14 has a lip portion 15 in contact with the side wall surface 11 of the track rail 1 to provide a sealing condition. The end seal 6 includes a metal plate 28 made of such metallic materials as steel, and a seal member 29 made of such elastic materials as rubber and plastics secured to the metal plate 28 to seal the sliding portions between the track rail 1 and the slider 19.

The under seals 12 are formed at their longitudinal ends with locking notches 16. The end seals 6, which are disposed on the outer side of the end caps, i.e. on the far side from the casing, have a pair of projections 7 formed at the lower ends thereof. The projections 7 of the end seals 6 are inserted into the locking notches 16 formed at both ends of the under seal 12. With the under seal 12 put in tight contact with the undersides of the casing 2 and the end caps 5, the free ends of the projections 7 are bent widthwise to form locking portions 25 that firmly grip the core member 13 of the under seal 12. The under seal 12 is thus supported by the bent locking portions 25 of the projections 7 of the end seals 6. This structure helps increase the distance H (FIG. 1) between the bed on which the track rail 1 is laid and the underside of the slider 19 (FIG. 6), enhancing the freedom of design.

As for the positioning of the under seal 12 with respect to the end seals 6, the lower end surface 23 of the under seal 6 and the upper surface 20 of the under seal 12 are contacted to accomplish the vertical positioning of the under seal 12. This is followed by bending the free ends of the projections 7 in the lateral direction to cause the upper surfaces 22 of the locking portions 25 to bear on the bottom surface of the under seal 12, thereby supporting the under seal 12 by the end seals 6. The lateral positioning of the under seal 12 is achieved by the engagement between lateral side surfaces 24 of the projections 7 of the end seals 6 and lateral side surfaces 26 of the locking notches 16. The longitudinal positioning is secured by the engagement between base surfaces 21 of the locking notches 16 and longitudinally inner side surfaces 27 of the projections 7. Hence, the under seal 12 can be positioned in all directions with respect to the end seals 6. This mounting structure is simple, not requiring other fastening parts.

Regarding the shape of the locking notch 16, it is shaped in a rectangular form, in the case of FIG. 1, with the width of the locking notch 16 cut in the core member 13 slightly smaller than that of the notch 30 cut in the seal member 14. The locking portions 25, or the bent free ends of the projections 7, directly bear on the core member 13, securely fastening the projections 7 to the core member 13. The width of the locking notch 16 in the core member 13 may be set equal to that of the notch in the seal member 14. In that case, the projections 7 will be bent to bear on the outside of the seal member 14. The locking notch 16 is formed to such a depth or longitudinal length as will enable the projections 7 of the end seal 6 to be positioned by the locking notch 16. The depth of the locking notch 16 may be increased to provide a space in which the under seal 12, when it elongates, can slide without abutting against the projections 7. In this case, a shim may be inserted in the gap to facilitate the positioning.

While in this embodiment the projections 7 are shown to be substantially parallel to each other, they may be formed otherwise. For example, the projections 7 may be laterally inclined to expand toward their ends. It is also possible to protrude the base portion of the projections 7 by an amount equal to the thickness of the core member 13 and form detents or projections at the end of the base portion.

While, in the above embodiment, the under seal 12 is provided with the lip portion 15 only on the side that is in contact with the side wall surface 11 of the track rail 1, it is possible to provide the under seal 12 with another lip portion on the far side from the lip portion 15 which bears on the undersides of the casing 2 and the end caps 5. This embodiment is shown to have a single locking notch 16 formed at each longitudinal end of the under seal 12 and a pair of projections 7 formed at the lower ends of the end seal 6 and bent to grip the ends of the under seal 12. It is also possible to form a pair of locking notches in each end of the under seal 12, fit the pair of projections of the end seal into the paired locking notches and bend them for firm gripping of the under seal. Furthermore, although the under seal 12 is shown to be flat as a whole, it may be formed otherwise in accordance with the shape of the undersides of the casing 2 and the end caps 5.

I claim:

1. A linear motion rolling guide unit comprising:
   a track rail having first raceway grooves formed on longitudinally extending side wall surfaces thereof;
   a casing slidable relative to the track rail and having second raceway grooves formed at positions facing the first raceway grooves;
   end caps mounted to the longitudinal ends of the casing;
   end seals attached to the end caps on the side opposite the casing;
   rolling elements circulating through raceways formed between the first raceway grooves and the second raceway grooves;
   under seals arranged on the undersides of the casing and the end caps, the under seals including core members and seal members secured to the core members for sealing the casing, the end caps and the track rail;
   downwardly protruding, paired projections provided, laterally spaced apart, to the lower ends of the end seals; and
   locking notches formed at both longitudinal ends of the under seals at positions corresponding to the paired projections of the end seals;
   wherein, to mount the core members of the under seals to the end seals, the paired projections of the end seals are inserted into the locking notches and the free ends of the paired projections are bent to form locking portions.

2. A linear motion rolling guide unit according to claim 1, wherein the paired projections of the end seals are bent away from each other in the lateral direction of the end seals.

3. A linear motion rolling guide unit according to claim 1, wherein gaps are formed between lateral side surfaces of the locking notches in the under seals and surfaces of the paired projections facing the lateral side surfaces of the locking notches.

4. A linear motion rolling guide unit according to claim 1, wherein the under seals are positioned with respect to the end seals by the locking notches in the under seals and the paired projections of the end seals.

5. A linear motion rolling guide unit according to claim 1, wherein the paired projections of the end seals have elasticity, and when the under seals elongate longitudinally by external force or thermal expansion, the longitudinal elongation of the under seals is offset by elastic deformations of the paired projections of the under seals.

6. A linear motion rolling guide unit according to claim 1, wherein the under seals are mounted to the end seals by bending the paired projections provided to the lower ends of the under seals so that the bent projections firmly grip the core members of the under seals and that a distance that the paired projections protrude below the under seals is very small.

7. A linear motion rolling guide unit according to claim 1, wherein lip portions of the under seals are pressed against the track rail by the elasticity of the paired projections of the end seals so that the free ends of the lip portions are in preloaded contact with the side wall surfaces of the track rail.

* * * * *